US006654928B1

(12) United States Patent
Terry et al.

(10) Patent No.: US 6,654,928 B1
(45) Date of Patent: Nov. 25, 2003

(54) HYBRID DIMENSIONAL, SPHERICAL SPACE-TIME CODING AND DECODING APPARATUS, AND ASSOCIATED METHOD, FOR A COMMUNICATION SYSTEM

(75) Inventors: John Terry, Garland, TX (US); Juha Heiskala, Irving, TX (US); Radha Srinivasan, Irving, TX (US)

(73) Assignee: Nokia Mobile Phones Limited, Espoo (FI)

( * ) Notice: Subject to any disclaimer, the term of this patent is extended or adjusted under 35 U.S.C. 154(b) by 407 days.

(21) Appl. No.: 09/619,824

(22) Filed: Jul. 20, 2000

(51) Int. Cl.$^7$ .................................. H03M 13/03
(52) U.S. Cl. .................. 714/792; 375/267; 375/299
(58) Field of Search ................. 714/796, 792, 714/794; 375/267, 299, 148; 700/53

(56) References Cited

U.S. PATENT DOCUMENTS

| | | | | |
|---|---|---|---|---|
| 4,761,784 A | * | 8/1988 | Srinivasagopalan et al. | 371/43 |
| 4,933,956 A | * | 6/1990 | Forney, Jr. | 375/94 |
| 5,396,518 A | * | 3/1995 | How | 375/265 |
| 5,751,725 A | * | 5/1998 | Chen | 371/5.5 |
| 6,094,739 A | * | 7/2000 | Miller et al. | 714/792 |

FOREIGN PATENT DOCUMENTS

WO   WO 99/45657   9/1999

OTHER PUBLICATIONS

Terry et al., Spherical Space–Time Codes (SSTC), Publication date: Mar. 2001, Manuscript received: Apr. 27, 2000, IEEE Communications letters, vol. 5, No. 3, pp. 107–109.*

Tarokh, Vahid, et al.: XP–002089112, "Space–Time Codes of High Data Rate Wireless Communication: Performance Criterion and Code Construction": IEEE Transactions on Information Theory, vol. 44, No. 2, Mar. 1998, pp. 744–765.

Tarokh, Vahid, et al: XP–000804974, "Space–Time Block Coding for Wireless Communications: Performance Results"; IEEE Journal on Selected Areas in Communications, vol. 17, No. 3, Mar. 1999, pp. 451–460.

Seshadri, N., et al.: "Space–Time Codes for Wireless Communication: Code Construction"; AT&T Labs–Research, IEEE 1997, pp. 637–641.

Tarokh, V.: "Space–Time Codes for High Data Rate Wireless Communication: Performance Criteria"; AT&T Labs–Research, IEEE 1997, pp. 299–303.

(List continued on next page.)

Primary Examiner—Stephen M. Baker
Assistant Examiner—Dipakkumar Gandhi
(74) Attorney, Agent, or Firm—Federico Fraccaroli

(57) ABSTRACT

Apparatus, and an associated method, for encoding and decoding data in a communication system. A hybrid dimensional Spherical Space-Time Code (SSTC) scheme is provided. Data to be transmitted upon a communication channel is encoded, and when received at a receiving station, the encoded sequence is decoded.

20 Claims, 4 Drawing Sheets

OTHER PUBLICATIONS

Wolf, Jack Keil, et al..: "P2 Codes: Pragmatic Trellis Codes Utilizing Punctured Convolutional Codes"; IEEE Communication Magazine, Feb. 1995, pp. 94–99.

Varansi, Mahesh, et al.: XP–002187442; "Complex Spherical Modulation for Noncoherent Communications"; ISIT 2000, Sorrento, Italy, Jun. 25–30, 2000; IEEE200, p. 163.

Wilson, Stephen G., et al.: XP–000793854; Four–Dimensional Modulation and Coding: an Alternate to Frequency–Reuse, Links for the Future, IEEE/Elsevier Science Publishers B.V. (North–Holland), 1984, pp. 919–923.

Wang, Fu–Quan, et al.: XP–000823359; "New Rotationally Invariant Four–Dimensional Trellis Codes"; IEEE Transactions on Information Theory, vol. 42, No. 1, Jan. 1996, pp. 291–300.

Pietrobon, S S et al: "Trellis–Coded Multidimensional Phase Modulation" IEEE Transactions on Information Theory, vol. 36, No. 1, pp. 63–89, Jan. 1990.

Chouly, A. et al: "Six–Dimensional Trellis–Coded Modulation" 1989 IEEE, pp. 1522–1527.

Al–Semari, S.A.; Fuja, T.E., Performance analysis of coherent TCM systems with diversity reception in slow Rayleigh fading, Jan. 1999, IEEE Transactions on Vehicular Technology, vol.: 48, Issue: 1, pp.: 198–212.*

John G. Proakis, Digital Communications, 1989, McGraw–Hill, Inc., second edition, pp. 65–66.*

* cited by examiner

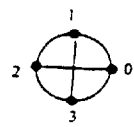
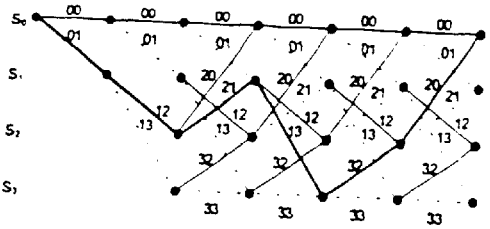
FIG. 6
FIG. 7

HYBRID DIMENSIONAL, SPHERICAL SPACE-TIME CODING AND DECODING APPARATUS, AND ASSOCIATED METHOD, FOR A COMMUNICATION SYSTEM

The present invention relates generally to a manner by which to communicate data on a channel susceptible to distortion. More particularly, the present invention relates to apparatus, and an associated method, by which to encode data with a multidimensional code, such as a hybrid dimensional SSTC (Spherical Space-Time Code) at a sending station and by which to decode the data, once received at a receiving station. Through operation of an embodiment of the present invention, data to be communicated upon a channel susceptible to fading, or other distortion, is encoded in a manner which facilitates recovery of the informational content of the data, once received at a receiving station.

BACKGROUND OF THE INVENTION

A communication system is formed, at a minimum, of a sending station and a receiving station interconnected by a communication channel. Data to be communicated by the sending station to the receiving station is converted, if necessary, into a form to permit its communication upon the communication channel. A communication system can be defined by almost any combination of sending and receiving stations, including, for instance, circuit board-positioned elements as well as more conventionally-defined communication systems used by spaced-apart users to communicate data therebetween.

When data communicated upon a communication channel is received at the receiving station, the receiving station acts upon, if necessary, the received data to recreate the informational content thereof. In an ideal communication system, the data, when received at the receiving station, is identical to the data when transmitted by the sending station. However, in an actual communication system, the data is distorted during its communication upon the communication channel. Such distortion distorts values of the data when received at the receiving station. If the distortion is significant, the informational content of the data, as transmitted, cannot be recovered.

A radio communication system is exemplary of a communication system utilized to communicate data between sending and receiving stations. In a radio communication system, the communication channel is formed of a radio communication channel. A radio communication channel is defined upon a portion of the electromagnetic spectrum. In a wireline communication system, in contrast, a physical connection extending between the sending and receiving stations is required to form the communication channel. Communication of data upon a radio communication channel is particularly susceptible to distortion due, in part, to the propagation characteristics of the radio communication channel. Data communicated on conventional wireline channels are also, however, susceptible to distortion in manners analogous to the manner by which distortion is introduced upon the data communicated in a radio communication system.

Digital communication techniques have been implemented in radio, as well as other, communication systems. Digital communication techniques generally permit the communication system in which the techniques are implemented to achiever greater communication capacity contrasted to conventional, analog communication techniques.

In a communication system which utilizes digital communication techniques, information which is to be communicated is digitized to form digital bits. The digital bits are typically formatted according to a formatting scheme. Groups of the digital bits, for instance, are positioned to form a packet of data.

Multi-path transmission of the data upon a radio, or other, communication channel introduces distortion upon the data as the data is actually communicated to the receiving station by a multiple number of paths. The data detected at the receiving station, as a result, is the combination of signal values of data communicated upon a plurality of communication paths. Intersymbol interference and Rayleigh fading causes distortion of the data. Such distortion, if not compensated for, prevents the accurate recovery of the transmitted data.

Various manners are used to compensate for the distortion introduced upon the data during its communication upon a communication path. For instance, by encoding the data, prior to its transmission, various redundancies are introduced into the data. When received at a receiving station, the redundancies are removed to recreate the informational content of the data. If portions of the data are distorted during transmission upon the communication path, the redundancies introduced upon the data increase the likelihood that the remaining portion of the data shall still permit the informational content of the data to be recovered. Generally, conventional encoding schemes are two-dimensional in nature. Higher-dimensional encoding schemes, if utilized, would increase the likelihood that data, communicated upon the channel susceptible to distortion, shall be recoverable when received at a receiving station. If the data were to be encoded using a multidimensional encoding scheme, the receiving station must correspondingly provide a manner by which to decode the multidimensionality data received thereat.

If a manner could be provided by which to multidimensionality encode data prior to its transmission upon a communication channel, and thereafter decode the multidimensionality-encoded data, improved quality of communications would be possible.

It is in light of this background information related communication of data that the significant improvements of the present invention have evolved.

SUMMARY OF THE INVENTION

The present invention, accordingly, advantageously provides apparatus, and an associated method, by which to communicate data on a channel susceptible to distortion.

Through operation of an embodiment of the present invention, data to be communicated upon a communication channel is encoded at a sending station with a hybrid dimensional SSTC (Spherical Space-Time Codes) to form an encoded sequence. During further operation of an embodiment of the present invention, once the encoded sequence is received at a receiving station, the encoded sequence of data decoded to recreate the informational content of the data communicated to the receiving station.

In one aspect of the present invention, a manner is provided by which to provide hybrid dimensional modulation of Spherical Space-Time Codes (SSTC) for a variety of fractional rate codes. Fractional code rates are achieved at reduced complexity and minimal loss in performance compared to a N-dimensional spherical code. Through operation of an embodiment of the present invention, many n/n+1 code rates are achievable which are, otherwise, not possible utilizing conventional N-dimensional spherical modulation schemes.

In another aspect of the present invention, a manner is provided by which to decode data encoded pursuant to a multidimensional trellis-based coding scheme, such as a N-dimensional Spherical Space-Time Code (SSTC) encoding scheme. An equalizer is provided capable of providing equalization operations upon an input signal applied thereto formed of an input signal set defined over any number of orthogonal dimensions, viz., the signal set forms a multidimensional signal set. Encoded data formed pursuant to a multidimensional trellis-based coding scheme is decoded pursuant to operation of apparatus provided pursuant to an embodiment of the present invention at a receiving station.

In one implementation, a manner is provided by which to encode data utilizing a hybrid dimensional modulation of spherical space-time codes at a sending station. Once encoded, the encoded data is communicated by a radio sending station upon a radio channel, thereafter to be received at a receiving station. The encoding of the data facilitates recreation of the informational content thereof to overcome the effects of distortion introduced upon the sequence when transmitted upon the communication channel. Apparatus is provided for the receiving station to decode the multidimensionality coded data received thereat. Because of the encoded nature of the data, distortion introduced thereon during communication to the receiving station is less likely to prevent recovery of the informational content of the data at the receiving station.

Branch metrics are calculated at an equalizer to determine a surviving path which defines a maximum likelihood path. During decoding operations to determine the maximum likelihood path, the similarity or distance between received signals of each sampling instant in time and all of the paths entering each state or node at the sampling time are measured. Trellis paths whose distance metrics are not a minimum for a particular node are eliminated from further consideration as a portion of a maximum likelihood path. That is to say, when two or more paths enter the same state, the one having the best metric is chosen and such path forms a surviving path. Selection of surviving paths is made for each of the states. Least-likely paths are successively eliminated at each state of the decoder operation while cumulative Hamming distances or Euclidean distances for each surviving path are calculated and recorded, thereby to be used to determine the maximum likelihood path.

New branch metrics, new reference values associated with the new branch metrics, new puncturing patterns, and new diversity combining methodologies are provided to a multidimensional Viterbi equalizer and diversity combiner provided pursuant to an embodiment of the present invention to decode spherical space-time codes.

In these and other aspects, therefore, apparatus, and an associated method, is provided for a communication system having a receiving station for receiving an encoded sequence of data formed of coordinates. Each coordinate of the sequence of data is selected from a multidimensional coordinate set. The encoded sequence communicated to the receiving station is communicated upon a communication channel. A trellis decoder decodes an indication of the encoded sequence once received at the receiving station. The trellis decoder includes a metric calculator coupled to receive indications of the encoded sequence. The metric calculator calculates branch metrics for each coordinate of the multidimensional coordinate set of which coordinates of the encoded sequence are formed. Each branch metric is formed responsive to a difference calculated between an indication of each coordinate of the encoded sequence and a reference value associated therewith. The metric calculator forms a maximum-likelihood sequence path of the multidimensional encoded sequence.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWING

FIG. 6 illustrates another trellis diagram, here representative of path selection diversity for spherical space-time coding pursuant to operation of an embodiment of the present invention.

FIG. 7 illustrates additional trellis diagrams representative of maximal ratio combining and equal diversity for spherical space-time coding pursuant to operation of an embodiment of the present invention.

DETAILED DESCRIPTION OF THE PREFERRED EMBODIMENT

Figure 1:
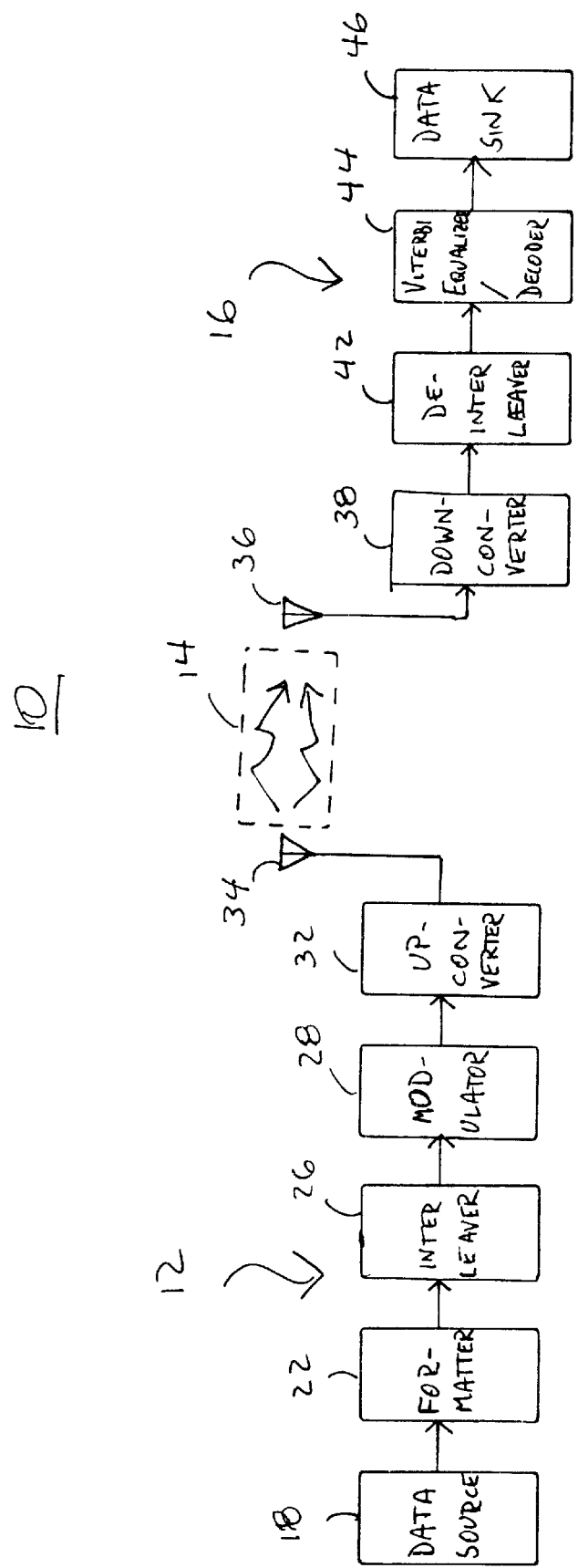
FIG. 1 illustrates a functional block diagram of a communication system in which an embodiment of the present invention is operable.

Turning first to FIG. 1, a communication system, shown generally at 10, is operable to communicate data between communication stations. In the exemplary implementation, the communication system forms a radio communication system, here a cellular communication system. It should be understood at the outset, however, that in other implementations, operation of an embodiment of the present invention is analogously operable. Analogous description of operation of an embodiment of the present invention in such other implementations can similarly be made.

The communication system 10 is here shown to include a sending station 12 operable to communicate data by way of a radio link 14 with a receiving station 16. When, for instance, the sending station 12 forms the transmit portion of a mobile station, data originated thereat is communicated upon a reverse link, or uplink, channel defined upon the radio link 14 to a receive portion of a base station of which the receiving station 16 is representative. The sending and receiving stations 12 and 16, respectively, are also representative of communications by a transmit portion of a base station to a receive portion of a mobile station. Channels defined upon the radio link 14, referred to as forward link, or downlink, channels are used to communicate the data from the base station to the mobile station.

The sending station 12 includes a data source 18 at which data to be communicated is originated. When the sending station 12 forms the transmit portion of a mobile station, the data source is formed, for instance, of voice data representative of speech information generated by a user of the mobile station. Data originated at the data source 18 is provided to a formatter 22 at which formatting of the data is performed. Formatting includes, for instance, digitization of the data. The data is thereafter interleaved at an interleaver 26. The interleaved data is thereafter provided to a modulator 28. The modulator 28 is operable pursuant to an embodiment of the present invention to perform hybrid dimensional modulation of spherical space-time codes, better to insure adequate recreation of the informational content of the data subsequent to reception at the receiving station 16. Once modulated, a modulated representation of the data, now forming an encoded sequence, is provided to an up-converter 32. The up-converter 32 is operable to up-convert in frequency the encoded sequence provided thereto to a transmit frequency. An antenna transducer 34 coupled to the up-converter, such as by way of a filter duplexer (not shown), transduces the signals provided thereto into electromagnetic form for communication upon the radio link 14.

An antenna transducer 36 of the receiving station 16 detects indications of the signals generated by the sending station 12. Such signals are transduced into electrical form and are provided to a down-converter 38, such as by way of a filter duplexer. The down-converter down-converts in frequency the signals applied thereto, here to a baseband frequency. A baseband representation of the encoded sequence, received at the receiving station is thereby generated by the down-converter.

The baseband representation is applied to a de-interleaver 42 operable to de-interleave the encoded sequence. A de-interleaved, encoded sequence is thereafter provided to a Viterbi equalizer/decoder 44 of an embodiment of the present invention. The equalizer/decoder is operable to decode the encoded sequence, encoded pursuant to a multidimensional trellis-based coding scheme. An n-dimensional Spherical Space-Time Code (SSTC) is exemplary of such a multidimensional coding scheme. A decoded sequence, forming a most a likely path, is thereafter provided to a data sink 46.

The modulator 28 forming a portion of the sending station 12 forms a higher dimensional, i.e., greater than two, modulation scheme which requires multiple transmission of complex samples across the radio link 14 to send each symbol of the resultant encoded sequence. If the transmissions are performed in time or frequency, an increased bandwidth requirement is necessitated relative to a conventional two-dimensional modulation scheme. Disadvantages associated with the increased bandwidth requirement are at least partially offset by gains in increased minimum free distance between code words which exceeds a power penalty associated with multiple transmissions. A similar goal is targeted when designing channel coding schemes for wireless communication systems. Higher dimensional modulation can thereby be considered to be another method of channel coding. A hybrid dimensional Spherical Space-Time Code (SSTC) for achieving desired fractional code rates with minimal performance impact is provided through operation of an embodiment of the present invention. Hybrid dimensional SSTC entails the alternate transmission of symbols defined over two or more different dimensions. The average rate, γ, is represented by the following equation:

$$\gamma = \frac{2n}{\sum_{k=1}^{n} \pi_k},$$

wherein:
  n is the number of symbols over which the code is defined; and
  k is the dimensionality associated with the kth transmitted symbol.

Analysis of the equation indicates that a number of fractional rates can be designed using just two different dimensions. For example, the rate 4/9 code is formed of four transmissions of a 4-D signal for every transmission of a 2-D signal as compared to five transmissions of a 2-D signal for an uncoded system.

The average performance of a hybrid rate code is dominated by the symbol transmission with the worst error rate. Parameters required to estimate the performance are the average signal power to noise per symbol and minimum distance for each dimension used.

As the number of dimensions is increased, an increase in minimum squared distance is evidenced. As the symbol error with the worst performance dominates overall performance, the best performance possible for a hybrid code occurs when each symbol is equally probable. However, the symbol selected from higher dimensions exhibits larger minimum squared distances, and symbols from lower dimensions have relatively greater average signal power to noise per symbol ratios. For instance, the average signal power to noise ratio for a two-dimensional signal is twice that of a four-dimensional signal. The difference in average signal power to noise ratio is attributed to the fact that the noise power is determined by the average rate of the code. This is greater than the lower dimensional symbol and less than the higher dimensional symbol. The difference in ratios is simply the ratio of the dimensionality of the symbols utilized.

To equalize, or balance, the disparity in average signal power to noise ratio and minimum square distance, each symbol is weighted prior to transmission by the sending station upon the radio link. A constraint on the weight is the requirement that the sum of the weights must equal the number of symbol transmissions so as not to increase the average transmit power. The efficacy in performance for the hybrid code, however, requires that the differences in gains in minimum square distance and average signal power to noise ratios be equally distributed amongst the symbols.

In the just-noted example, the gain in average signal power to noise ratios for the symbols is doubled in favor of the two-dimensional signal. On the other hand, the gain in the minimum squared distances for the symbols is a factor of three in favor of the four-dimensional signal. As a result, the performance difference in gains is 3/2 in favor of minimum squared distances. Half of this equals 0.75. Hence, the amplitude of the four-dimensional signal is scaled by a square root of 0.75, and the amplitude of the two-dimensional signal is scaled by the square root of 1.25.

In many situations, it is possible to design the desired code rate such that each of the transmitted complex samples is generated from one symbol, i.e., an even number of dimensions. Compared to non-hybrid systems that utilize symbols with an odd number of dimensions, the hybrid dimensional system results in an exponential decrease in the complexity of the equalizer 44 construction of the receiving station. On the other hand, for non-hybrid systems that utilize symbols with an even number of dimensions, the hybrid dimensional system results in nearly a nominal increase in complexity. And, depending upon the weights, minimum distance properties, and average signal power to noise ratios, the performance degradation for a hybrid dimensional system is low and sometimes almost negligible.

Figure 2:
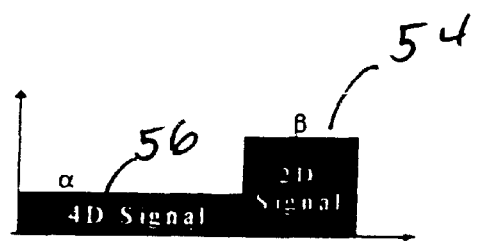
FIG. 2 illustrates a representation of a hybrid rate 2/3 system exemplary of coding capable of being formed pursuant to operation of an embodiment of the present invention.

FIG. 2 illustrates the values associated with the two-dimensional signal and the four-dimensional signal. Here, the average signal to noise ratio 54 of the two-dimensional signal is shown to be twice as great as the corresponding value 56 of the four-dimensional signal.

When the sequence is received at the receiving station, the sequence differs with corresponding values of the sequence when transmitted at the sending station due to distortion introduced thereon during transmission upon the radio link. Such distortion occurs as a result of, for instance, multi-path fading or Rayleigh fading. Operation of the decoder 44 provides an estimate of the transmitted code responsive to the received sequence. Generally, optimal decoder strategy for trellis-based encoded data is to select a codeword with the minimum distance metric, either the Hamming distance or the Euclidean distance. As an encoder for a trellis code exhibits memory, it is reasonable to use all codewords associated with a particular symbol in the decision determination therefor. Hence, for trellis codes, a sequence of codewords or paths through the trellis are compared to determine the transmitted codeword. Utilization of a Viterbi equalizer-algorithm performs maximum likelihood decoding with reduced computational load by taking advantage of the special structure of the code trellis.

Generally, Viterbi decoding is based upon the principle that when any two or more paths in a trellis merge to a single state, at least one of the paths can be eliminated in the search for an optimum path. During Viterbi decoding, the similarity or distance between receive signals at each sampling instant and all paths entering each state or node at the sampling instant is determined. Trellis paths whose distance metrics are not the minimum for a particular node are eliminated. That is to say, when two or more paths enter the same state, the path having the best metric is chosen. This path is referred to as the surviving path. Selection of the surviving paths is performed for all states. Successive decisions are made responsive to measurements to eliminate least likely paths. In the process, the cumulative Hamming distance or Euclidean distance for each surviving path is recorded and used later to determine the maximum likelihood path.

When multidimensional coding sets are utilized, symbols of the encoded sequence are defined over more than two coordinates. A branch metric, γ, is computed over all coordinates as follows:

$$\gamma_i^m = \sum_k (r_k^m - \alpha_{ik})^2$$

where m is a time instance;

$r_k^m$ is the kth coordinate of the received soft decision symbol at time instance m; and $\alpha_{ik}$ is the ith reference value of the kth coordinate.

Figure 3:
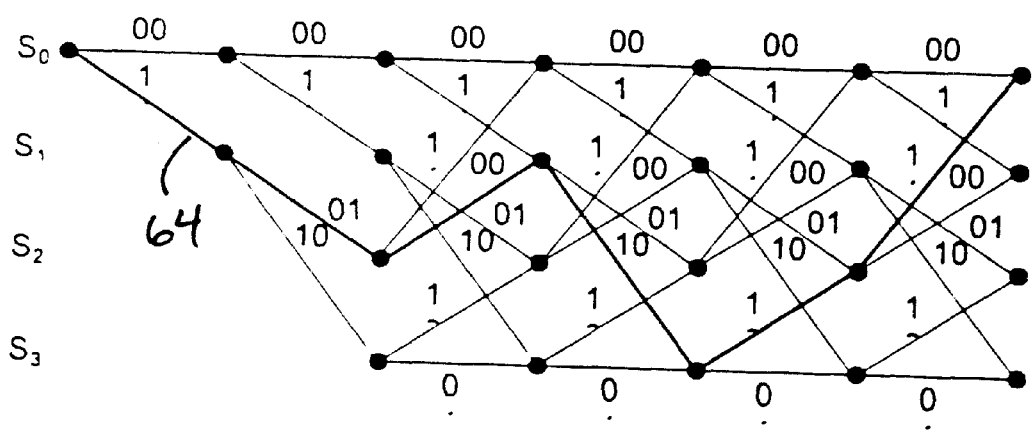
FIG. 3 illustrates a trellis diagram by which a Viterbi equalizer can be represented.

FIG. 3 illustrates an exemplary trellis, shown generally at 62. The trellis is defined by a plurality of states $S_0$, etc. A maximum likelihood path 64 is calculated by calculating branch metrics and selecting a surviving path at each state.

Generally, the value $r^m$ at time instant m is formed of a linear combination of a current pair of coordinates in complex format $s_n$ and scaled versions of previous coordinate pairs $s_{m-1}$, etc. The reference values associated with each state and branch of the trellis must be enumerated over all permitted transmit sequences. The number of symbols decoded simultaneously, γ, from the channel at any time is:

$$\gamma = 2p/M$$

wherein:

M is the number of coordinates per symbol;

L is the cardinality of the signal set; and p is the length of the channel response in time epochs.

Analysis of the equation indicates that $L^\gamma$ number of reference values and states are required for the trellis. Every symbol can take on L distinct values. And, each state requires L branch metrics to be calculated.

Whenever the number of coordinates per symbol is odd, then the channel introduces intersymbol interference even for flat fading channels. This leads to further complexity in the decoding process. In this situation, all complex samples associated with the two different symbols must be jointly decoded. Hence, the decoder must be able to store and to calculate $L^2$ branch metrics per state. And, in other words, at each transition in the trellis, there are $L^2$ branches emanating from the $L^\gamma$ states.

A puncturing methodology is also utilized. One variety of puncturing entails puncturing symbols, and the other variety of puncturing entails puncturing coordinates. Puncturing of symbols follows traditional puncturing methodology as used with conventional and trellis codes. Puncture patterns are applied to the symbols at the output of the encoder prior to transmission across the multiple antennas. In this manner, the information rate for the system increases compared to an unpunctured system.

Puncturing methodology pursuant to an embodiment of the present invention generally adheres to three rules. First, no more than t consecutive coded symbols are punctured for t transmit antennas STC. Second, punctured symbols are uniformly distributed amongst the t transmit antennas. And, third, valid puncturing patterns yield, if there are any, parallel transitions that are associated with signals of the subsets in the lowest layer of a set partitioning tree.

Figure 4:
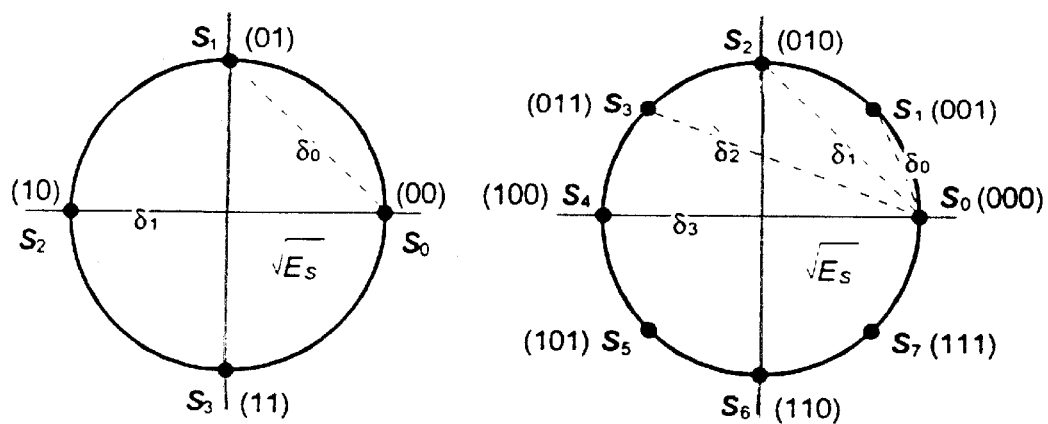
FIG. 4 illustrates graphical representations of subset partition distances representative of a partitioning tree utilized in an exemplary implementation of the present invention.

FIG. 4 illustrates graphically a 4PSK and an 8PSK symbol set with symbols S. The parallel transmission δ1 in the QPSK symbol set and the transition δ3 in 8PSK symbol set are representative of the third rule.

A puncturing methodology inherently requires two input signals to be detected jointly, as is the case for an odd number of coordinates per symbol. A corresponding increase in complexity in the decoding process is required as a result. In addition, puncturing of symbols for SSTC (Spherical Space-Time Coding) results in a time-varying trellis.

Figure 5:
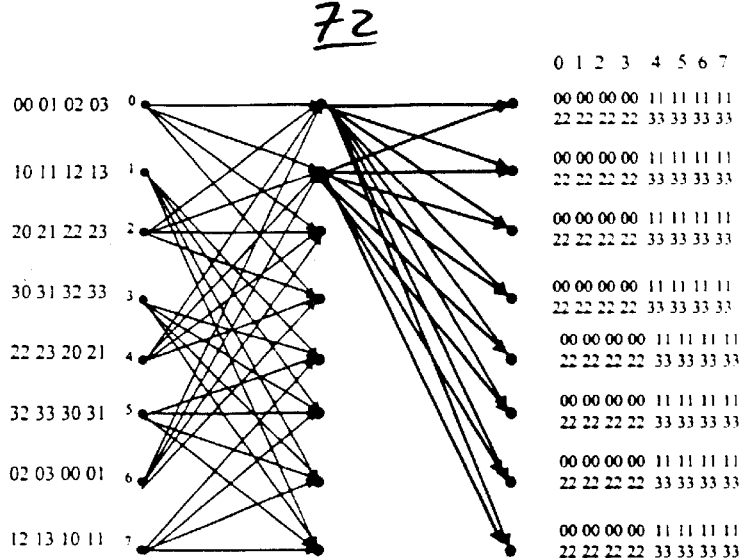
FIG. 5 illustrates a representation of a time-varying trellis indicative of puncturing of symbols during operation of an embodiment of the present invention.

FIG. 5 illustrates a time-varying trellis, shown generally at 72. An unpunctured codeword follows the original trellis, while the punctured codewords result in a different set of transitions between states. This requires the decoder to store the state information for multiple trellises and to keep track of which codeword to apply to each of the trellises.

Puncturing of coordinates, if performed in a traditional manner, would entail the removal of coordinates from one or more coded symbols and combining them with coordinates of other coded symbols. For example, to derive a rate of 2/3 code from a rate 1/2 code, one coordinate from adjacent four-dimensional symbols is punctured and the remaining six coordinates are combined together and transmitted upon the radio link as the average symbol is formed of three coordinates per symbol rather than four coordinates. The rate of the system compared to a two-dimensional symbol increases from 1/2 to 2/3. However, this change is derived at the expense of added complexity in the receiver as half of the complex samples are derived from two different codewords. Then, they must be decoded jointly. Alternatively, two coordinates could be punctured from one codeword and transmitted over the four-dimensional symbol unpunctured.

Pragmatic codes are formed of coded bits and uncoded bits. Typically, the least reliable bits are encoded and grouped with a set of uncoded bits to form a codeword. The codeword is then modulated and transmitted upon a channel. In one implementation, some symbols are defined over a higher dimensional coordinate system, and the remaining symbols are defined over a traditional two-dimensional coordinate system. For instance, to create a rate of 2/3 codes, half of the codewords are defined over a two-dimensional coordinate system, and the other half are defined over a four-dimensional coordinate system. In this way, the need for joint detection of multiple input symbols is avoided as each complex sample is derived for a single codeword. Also, the free distance for these pragmatic codes can typically approach or achieve that for the corresponding non-pragmatic rate. The impact on the decoding process is nominal with respect to complexity. For example, the branch metric associated with each rate must be computed using the correct number of coordinates per symbol after which the decoding process proceeds in a normal manner.

An additional benefit of sending multiple complex samples per symbol is that interleaving of the complex samples across the data frame is facilitated. As all of the complex samples are transmitted simultaneously, time or frequency diversity is accommodated in the system by positioning, if possible, complex samples within the frame sufficiently apart as that they experience weakly correlated or independent fading. At the receiving station, de-interleaving is employed prior to computation of the branch metrics, and the remaining decoding process proceeds in normal manner.

At the decoder, as the complex samples associated with each symbol all follow the state transition behavior defined by the trellis, each complex sample provides sufficient statistics to decode the transmitted symbol provided that no two different symbols from the constellation generate the same complex samples from the coordinates. When this condition is satisfied, diversity-combining techniques, such as switch path combining, equal gain combining, and maximal ratio combining are all feasible at the decoder.

FIGS. 6 and 7 illustrate path selection diversity and maximal ratio combining in equal diversity for spherical space-time coding.

Thereby, a manner is provided by which to communicate data on a channel susceptible to distortion. When utilized, an improved communication quality of communications is permitted.

The preferred descriptions are of preferred examples for implementing the invention, and the scope of the invention should not necessarily be limited by this description. The scope of the present invention is defined by the following claims.

We claim:

1. In a communication system having a receiving station for receiving encoded sequences of data formed of coordinates using hybrid dimensional spherical space-time codes, each coordinate thereof selected from a hybrid-dimensional coordinate set, the encoded sequence communicated to the receiving station upon a communication channel, the communication channel being subject to fading, an improvement of a trellis decoder for decoding indications of the spherical space-time encoded sequences once received at the receiving station, said trellis decoder comprising:

a metric calculator coupled to receive indications of the spherical space-time encoded sequences, the encoded sequences having been formed using a hybrid dimensional coordinate set derived from at least two different dimensionality bases, said metric calculator for calculating branch metrics for each spherical space-time symbol, each branch metric formed responsive to a difference calculated between an indication of each coordinate of the spherical space-time encoded sequences and a reference value associated therewith, said metric calculator forming a maximum-likelihood sequence path of each hybrid-dimensional spherical space-time symbol.

2. The trellis decoder of claim 1 wherein the reference value associated with each coordinate of the spherical space-time encoded sequence comprises a selected one of a plurality of reference values, wherein the number of reference values in the plurality of reference values is related to a cardinality associated with allowable values of coordinates of the encoded sequence.

3. The trellis decoder of claim 2 wherein the number of reference values of the plurality of reference values is exponentially related to a number of branch metrics calculated by said metric calculator.

4. The trellis decoder of claim 1 wherein the indication of each coordinate of the encoded sequence responsive to which the branch metrics are calculated comprises a soft-decision value.

5. The trellis decoder of claim 4 wherein the soft-decision value comprises a linear combination of a current coordinate together with a scaled value of at least one prior coordinate.

6. The trellis decoder of claim 1 wherein allowable values of coordinates of the encoded sequence have associated therewith a cardinality, wherein states are defined by said metric calculator, and wherein said metric calculator calculates a number of branch metrics per state exponentially related to the cardinality.

7. The trellis decoder of claim 1 wherein the spherical space-time encoded sequences includes punctured code symbols, and wherein said metric calculator further computes branch metrics at rates corresponding to manners by which the punctured code symbols are included in the spherical space-time encoded sequences.

8. The trellis decoder of claim 1 wherein each of the spherical space-time encoded sequences comprises a series of interleaved complex samples interleaved according to an interleaving scheme and formatted to form a data frame, said trellis decoder further comprising:

a de-interleaver coupled to receive the indication of the encoded sequence formed of the series of the interleaved samples, said de-interleaver for de-interleaving the encoded sequence to form a de-interleaved representation of the encoded sequence.

9. The trellis decoder of claim 8 wherein the de-interleaved representation of the spherical space-time encoded sequence is provided to said branch metric calculator, said branch metric calculator further for performing switch path combining operations upon the de-interleaved representation.

10. The trellis decoder of claim 8 wherein the de-interleaved representation of the spherical space-time encoded sequence is provided to said branch metric calculator, said branch metric calculator further for performing equal gain combining operations upon the de-interleaved representation.

11. The trellis decoder of claim 8 wherein the de-interleaved representation of the spherical space-time encoded sequence is provided to said branch metric calculator, said branch metric calculator further for performing maximal ratio combining operation upon the de-interleaved representation.

12. In the communication system of claim 1, the communication system further having a sending station for sending the spherical space-time encoded sequence of data upon the communication channel to the receiving station, a further improvement of a modulator for forming the encoded sequence, said modulator comprising:

a hybrid-dimensional spherical space-time code (SSTC) generator coupled to receive data to be communicated to the receiving station, said hybrid dimensional SSTC generator defining a first dimension and at least a second dimension, said hybrid-dimensional SSTC generator for encoding the data at a selected level of dimensions greater than two defined thereat and for generating symbols over each of the dimensions.

13. The modulator of claim 12 wherein said hybrid dimensional SSTC generator defines a fractional coding rate, the fractional coding rate related to a number of symbols of the data over which said hybrid-dimensional SSTC generator encodes the data.

14. The modulator of claim 13 wherein the fractional coding rate is directly proportional to the number of symbols of the data over which said hybrid-dimensional SSTC generator encodes the data.

15. In a method for communicating in a communication system having a receiving station for receiving a spherical space-time encoded sequence of data formed of coordinates, the spherical space-time encoded sequence having been formed using a hybrid-dimensional coordinate set that is derived from at least two different dimensionality bases, an improvement of a method for decoding the spherical space-time encoded sequence once received at the receiving station, said method comprising:

applying indications of the spherical space-time encoded sequence to a metric calculator;

calculating branch metrics at the metric calculator for each coordinate of the multidimensional coordinate set of which coordinates of the spherical space-time encoded sequence are formed, each branch metric formed responsive to a difference calculated between an indication of each coordinate of the spherical space-time encoded sequence and a reference value associated therewith; and forming a maximum likelihood sequence path of the spherical space-time encoded sequence responsive to the branch metrics calculated during said operation of calculating.

16. In the method of claim 15, the communication system further having a sending station for sending the spherical space-time encoded sequence of data upon the communication channel to the receiving station, a further improvement of a method at the sending station for forming the spherical space-time encoded sequence, said method comprising:

applying data to be communicated to the receiving station to a hybrid-dimensional SSTC generator; and encoding the data at the hybrid dimensional SSTC generator in a multiple number of dimensions, thereby to form symbols over each of the dimensions.

17. The method of claim 16 further comprising the additional operation at the sending station of interleaving the data encoded during said operation of encoding.

18. The method of claim 17 further comprising the additional operation at the receiving station of de-interleaving indications of the encoded sequence.

19. The method of claim 15 wherein the reference value associated with each coordinate of the spherical space-time encoded sequence comprises a selected one of a plurality of values, the plurality of a number related to a cardinality associated with allowable values of coordinates of the spherical space-time encoded sequence.

20. The method of claim 19 wherein the number of reference values of the plurality of reference values is exponentially related to a number of branch metrics calculated during said operation for calculating.

* * * * *